(12) United States Patent
Bastani et al.

(10) Patent No.: US 11,603,774 B2
(45) Date of Patent: *Mar. 14, 2023

(54) TURBOCHARGER BEARING ASSEMBLY AND METHOD FOR PROVIDING THE SAME

(71) Applicant: Transportation IP Holdings, LLC, Norwalk, CT (US)

(72) Inventors: Yaser Bastani, Niskayuna, NY (US); Walter Chandler, Niskayuna, NY (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 223 days.

This patent is subject to a terminal disclaimer.

(21) Appl. No.: 16/719,504

(22) Filed: Dec. 18, 2019

(65) Prior Publication Data

US 2020/0123930 A1 Apr. 23, 2020

Related U.S. Application Data

(63) Continuation of application No. 15/336,890, filed on Oct. 28, 2016, now Pat. No. 10,519,803, which is a
(Continued)

(51) Int. Cl.
*F01D 25/16* (2006.01)
*F04D 29/051* (2006.01)
(Continued)

(52) U.S. Cl.
CPC .......... *F01D 25/162* (2013.01); *F01D 25/168* (2013.01); *F02C 7/06* (2013.01);
(Continued)

(58) Field of Classification Search
CPC .......... F01D 25/16; F01D 25/162; F02C 6/12; F02C 7/06; F04D 29/041; F04D 29/0413;
(Continued)

(56) References Cited

U.S. PATENT DOCUMENTS 3,056,634 A * 10/1962 Woollenweber, Jr. .. F16C 27/02
417/407
4,749,334 A * 6/1988 Byrne ...................... F01D 5/025
416/241 B
(Continued)

FOREIGN PATENT DOCUMENTS

EP 2420651 A2 * 2/2012 ........... F01D 25/162
WO 2006074028 A1 7/2006
(Continued)

OTHER PUBLICATIONS

Preliminary Report dated Mar. 10, 2020 for corresponding Brazilian patent application BR112014027895-4 (4 pages).

*Primary Examiner* — Christopher R Legendre
(74) *Attorney, Agent, or Firm* — The Small Patent Law Group LLC; Will Breeze

(57) ABSTRACT

An integrated bearing assembly includes a thrust bearing disposed along a face of a turbocharger casing in a turbocharger and extending circumferentially around an axis of rotation of a rotor of the turbocharger, and a dual film journal bearing radially disposed between the rotor and the turbocharger casing which can be semi-floating or fully floating. The journal bearing includes a shoulder step radially extending away from the rotor. The shoulder step of the journal bearing engages one or more of the thrust bearing or the turbocharger casing to prevent axial movement of the dual film journal bearing relative to the turbocharger casing.

18 Claims, 7 Drawing Sheets

Related U.S. Application Data continuation-in-part of application No. 15/199,442, filed on Jun. 30, 2016, now abandoned.

(51) Int. Cl.

| | | |
|---|---|---|
| *F04D 29/057* | (2006.01) | |
| *F04D 29/047* | (2006.01) | |
| *F04D 29/041* | (2006.01) | |
| *F02C 7/06* | (2006.01) | |
| *F16C 33/66* | (2006.01) | |
| *F16C 17/10* | (2006.01) | |

(52) U.S. Cl.
CPC ..... *F04D 29/0413* (2013.01); *F04D 29/0473* (2013.01); *F04D 29/057* (2013.01); *F04D 29/0513* (2013.01); *F16C 17/107* (2013.01); *F16C 33/6659* (2013.01); *F05D 2220/40* (2013.01); *F05D 2230/64* (2013.01); *F05D 2240/54* (2013.01); *F05D 2260/30* (2013.01); *F16C 2360/24* (2013.01)

(58) Field of Classification Search
CPC ............... F04D 29/047; F04D 29/0473; F04D 29/0513; F04D 29/057; F05B 2240/52; F05B 2240/53; F05B 2240/54; F05D 2240/52; F05D 2240/53; F05D 2240/54; F16C 17/107; F16C 33/6659; F16C 2360/24

See application file for complete search history.

(56) References Cited

U.S. PATENT DOCUMENTS

| | | | |
|---|---|---|---|
| 5,558,444 A | 9/1996 | Ide | |
| 5,662,391 A | 9/1997 | McKay | |
| 5,785,493 A * | 7/1998 | Ojima | F02C 6/12 415/174.1 |
| 6,032,466 A | 3/2000 | Woollenweber et al. | |
| 6,155,720 A | 12/2000 | Battig | |
| 6,352,315 B1 | 3/2002 | Yin | |
| 6,669,308 B1 | 12/2003 | Aurich et al. | |
| 7,416,262 B2 | 8/2008 | Ring et al. | |
| 8,348,595 B2 * | 1/2013 | Koch | F02C 6/12 415/111 |
| 8,740,465 B2 | 6/2014 | McKeiman, Jr. | |
| 8,845,271 B2 | 9/2014 | Woollenweber | |
| 9,284,918 B2 | 3/2016 | Ono et al. | |
| 9,581,044 B2 | 2/2017 | House et al. | |
| 10,519,803 B2 * | 12/2019 | Bastani | F16C 33/6659 |
| 2005/0047690 A1 | 3/2005 | Keramati et al. | |
| 2014/0090626 A1 * | 4/2014 | An | F02B 33/40 123/565 |
| 2015/0322958 A1 | 11/2015 | Date et al. | |
| 2019/0154043 A1 | 5/2019 | Fujita et al. | |
| 2020/0123930 A1 * | 4/2020 | Bastani | F02C 7/06 |

FOREIGN PATENT DOCUMENTS

| | | | | |
|---|---|---|---|---|
| WO | WO-2013154852 A1 * | 10/2013 | ........... | F01D 25/166 |
| WO | WO-2014168803 A1 * | 10/2014 | ........... | F01D 25/145 |

\* cited by examiner

TURBOCHARGER BEARING ASSEMBLY AND METHOD FOR PROVIDING THE SAME

CROSS-REFERENCE TO RELATED APPLICATIONS

This application is a continuation of U.S. patent application Ser. No. 15/336,890, filed on 28. Oct. 2016, which is a continuation-in-part of U.S. patent application Ser. No. 15/199,442, filed 30 Jun. 2016. The entire disclosures of these application are incorporated herein by reference.

FIELD

The subject matter described herein relates to hydrodynamic bearings used in turbochargers.

BACKGROUND

Some turbochargers utilize semi-floating dual film journal bearings to take advantage of the high tolerance of these bearings to the imbalances in the rotor system. Sometimes, a journal bearing is integrated with a thrust bearing for a compact design and to use the same oil feed and drain passage. These types of bearings may be heavy-duty bearings with the ability to support axial and/or radial loads of the rotor in the turbochargers.

These types of journal bearings, however, need specific mechanical boundary conditions to allow the journal bearing to move or float in the radial direction, while being prevented from rotation and also restrained in the axial direction. In order to provide such a complicated mechanical boundary condition, additional parts or fasteners may need to be added to the turbocharger. These parts are part of the bearing design in the turbocharger to prevent or restrict movement of the journal bearings.

For the benefits achieved by adding a semi-floating journal bearing to a turbocharger, adding new parts to the turbocharger also introduces problems. For example, the new parts add additional points of failure of the turbocharger, may require longer time to install on a turbocharger, can increase the cost of the turbocharger, and/or can make it more difficult or costly to retrofit an existing turbocharger with the semi-floating journal bearing.

BRIEF DESCRIPTION

In one embodiment, an integrated bearing assembly includes a thrust bearing disposed along a face of a turbocharger casing in a turbocharger and extending circumferentially around an axis of rotation of a rotor of the turbocharger, and a dual film journal bearing radially disposed between the rotor and the turbocharger casing. The journal bearing includes a shoulder step radially extending away from the rotor. The shoulder step of the journal bearing is placed and axially restrained between the casing of the turbocharger and the thrust bearing with a clearance. Therefore, it prevents axial movement of the journal bearing relative to the thrust bearing or the turbocharger casing.

In one embodiment, an integrated bearing assembly includes a thrust bearing disposed along a face of a turbocharger casing. The thrust bearing includes a recess along an inner diameter of the thrust bearing. The bearing assembly also includes a dual film journal bearing radially disposed between a rotor and the turbocharger casing. The journal bearing includes a shoulder step radially extending away from the rotor toward the thrust bearing, and is located in the above mentioned recess of the thrust bearing. The shoulder step of the journal bearing prevents axial movement of the journal bearing by engaging one or more of the thrust bearing or the turbocharger casing.

In one embodiment, a method includes obtaining a semi-floating journal bearing of a turbocharger having an outwardly and radially extending shoulder step, positioning the journal bearing into a casing of the turbocharger, and positioning a thrust bearing onto a surface of the casing of the turbocharger such that the shoulder step of the journal bearing engages one or more of the thrust bearing or the casing of the turbocharger to prevent axial movement of the journal bearing relative to the one or more of the thrust bearing or the casing of the turbocharger.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
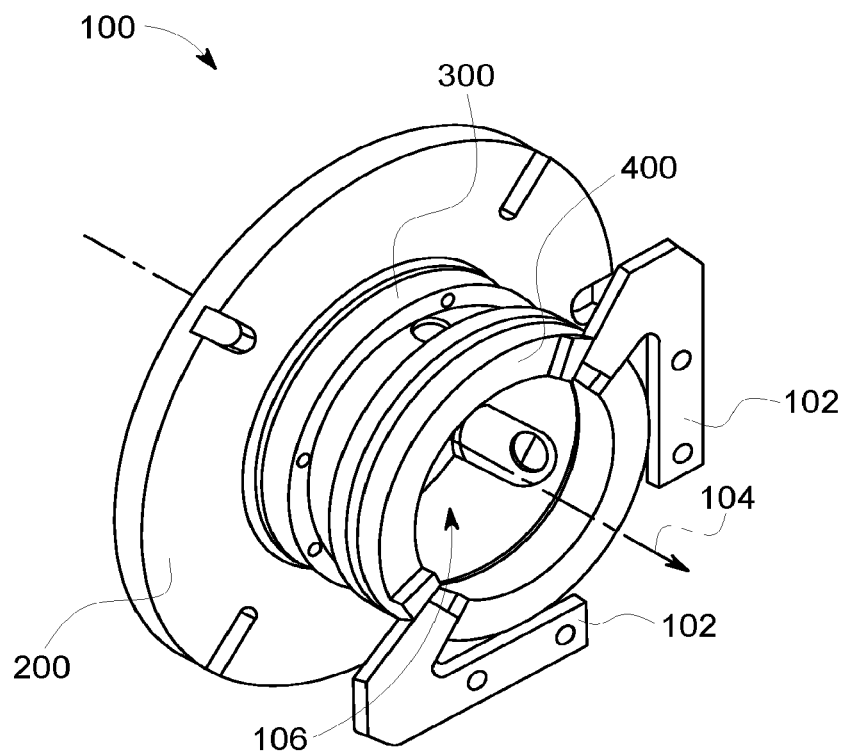
FIG. 1 illustrates an integrated bearing assembly.

The inventive subject matter described herein provides an integration scheme for bearing assembly, including a semi-floating journal bearing and a thrust bearing in the turbocharger. This integration design provides appropriate mechanical boundary conditions for a semi-floating journal bearing with a simple design, without adding more components, parts, or fasteners to the turbocharger. As a result, the inventive subject matter described herein facilitates simple and effective integration of the thrust bearing and semi-floating journal bearing into new and/or existing (e.g., in-service) turbochargers as a retrofit modification. The integrated dual film bearing assembly can be easily and quickly introduced into turbochargers currently in-service, without the need to machine the cast casings of the turbochargers, which can be a significant, time-consuming and expensive process.

FIGS. 1 through 5 illustrate views of a semi-floating journal bearing assembly 100. The bearing assembly 100 shown in FIGS. 1 through 5 does not include certain aspects of the inventive subject matter described herein. The bearing assembly 100 includes a thrust bearing 200 to which the semi-floating journal bearing 300 is coupled. A spacer ring 400 is coupled with the journal bearing 300 such that the journal bearing 300 is between the thrust bearing 200 and the spacer ring 400. Retaining tabs 102 are engaged with the spacer ring 400 and bolted to the casing or housing 500 of the turbocharger. The rotor of the turbocharger is located in an opening 106 of the bearing assembly 100.

Figure 2:
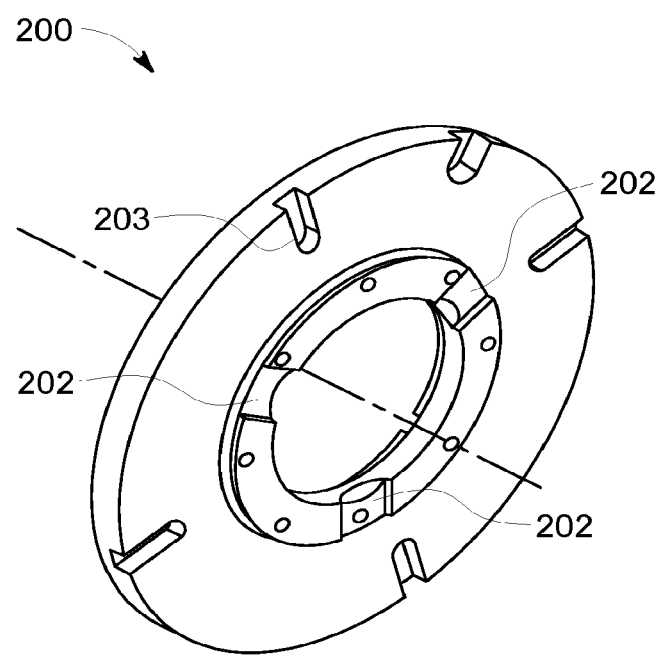
FIG. 2 illustrates the thrust bearing of the integrated bearing assembly shown in FIG. 1.
Figure 3:
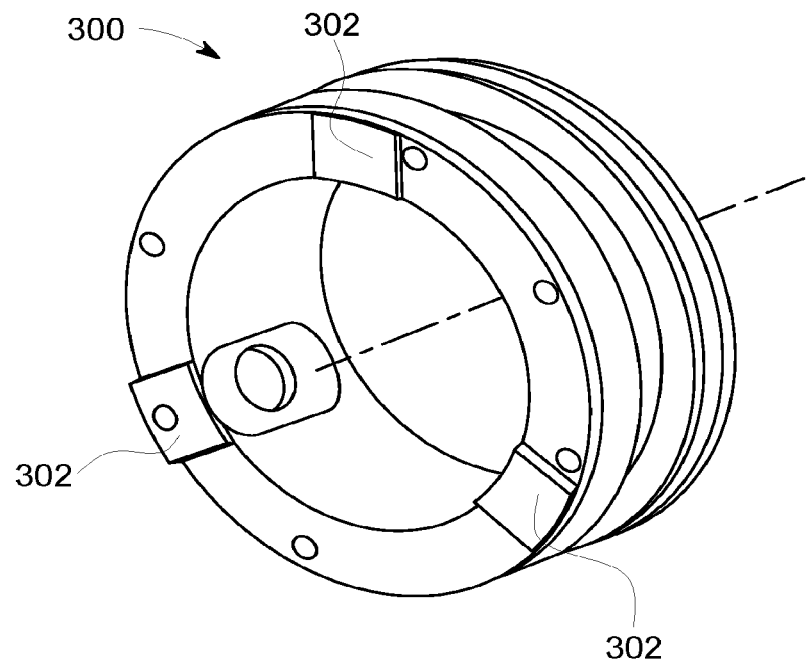
FIG. 3 illustrates the semi-floating journal bearing of the integrated bearing assembly shown in FIG. 1.
Figure 4:
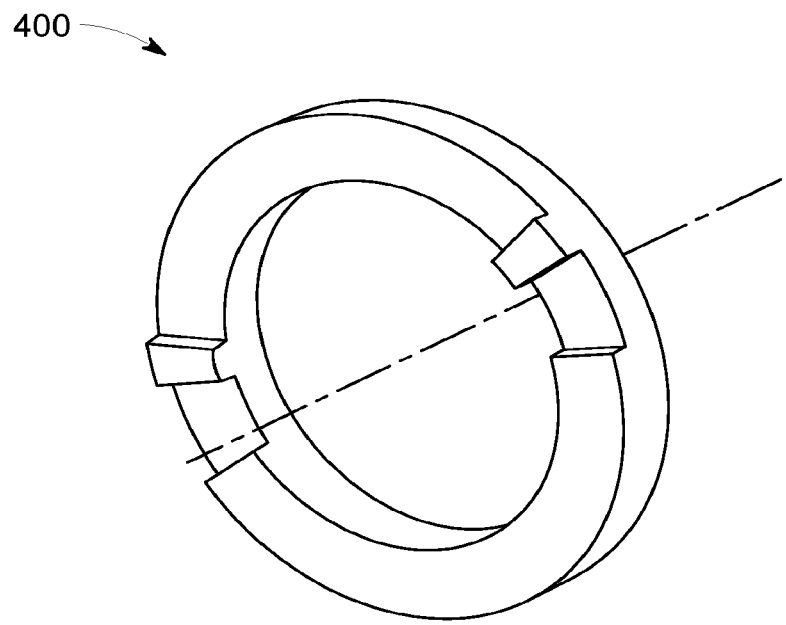
FIG. 4 illustrates the spacer ring of the integrated bearing assembly shown in FIG. 1.
Figure 5:
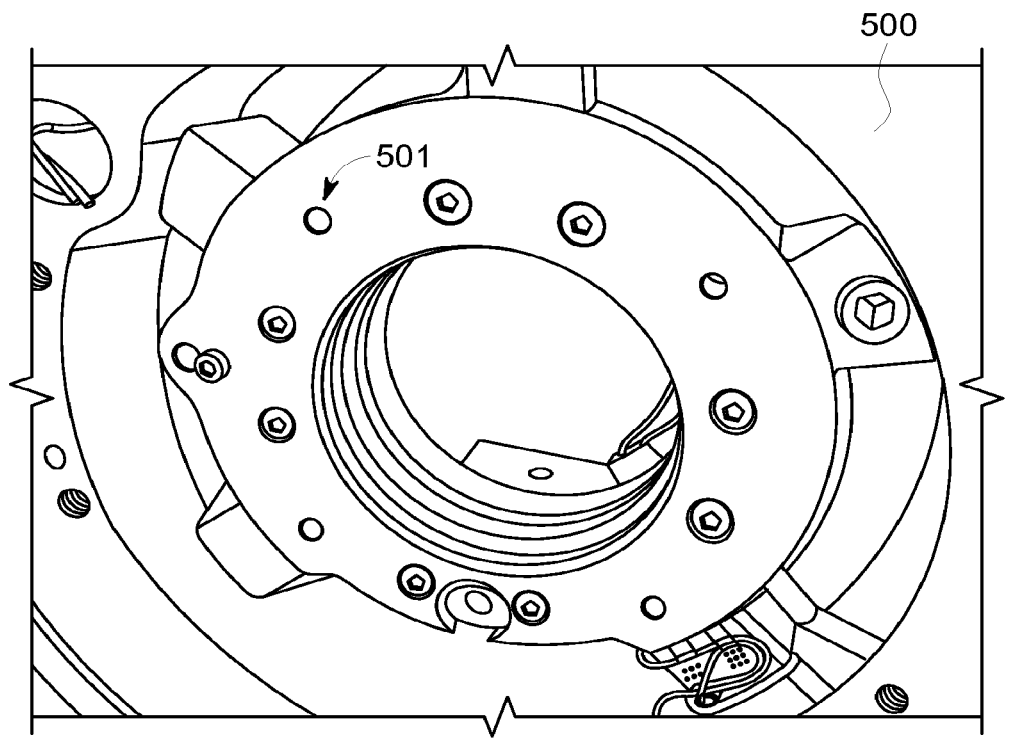
FIG. 5 illustrates the turbocharger housing where the semi-floating journal bearing assembly shown in FIG. 1 is installed into.

The spacer ring 400 keeps the journal bearing 300 axially in place, along an axial direction 104 of the bearing assembly 100. The thrust bearing 200 and journal bearing 300 have mating features (e.g., recesses 202 and protrusions 302) that engage each other to prevent rotation of the journal bearing 300 around the rotor or opening 106. Thrust bearing itself is in contact with the turbocharger casing 500 and prevented from rotation using multiple (e.g., four) dowel pins placed in holes 501 in the casing, as shown in FIG. 5. These dowel pins engage with multiple (e.g., four) trenches 203 machined on the backside of the thrust bearing, as shown in FIG. 2. Connecting the spacer ring 400 to the casing of the turbocharger with the retaining tabs 102 prevents the spacer ring 400 from axially moving relative to the journal bearing 300, which prevents axial movement of the journal bearing 300 (as described above).

However, the addition of the spacer ring 400, mating features, and retaining tabs 102 adds significant complexity, cost, and points of potential failure to the turbocharger. This can make retrofitting an existing turbocharger with the bearing assembly 100 too expensive or complex to do on a large scale, such as across a fleet of turbochargers due to manufacturing variances in the turbochargers. As a result, these types of bearing assemblies 100 may not be as widely used as possible.

Figure 6:
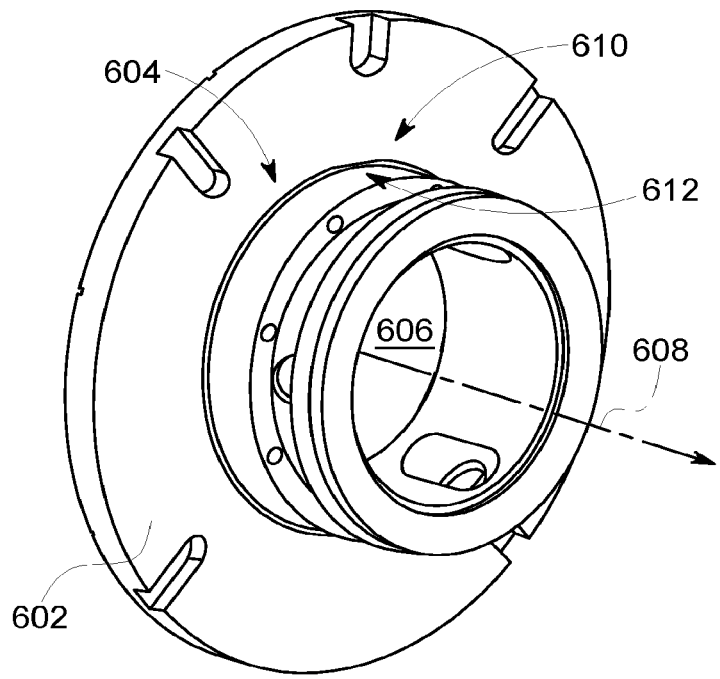
FIG. 6 illustrates a perspective view of a turbocharger bearing assembly according to one embodiment of the inventive subject matter described herein.
Figure 7:
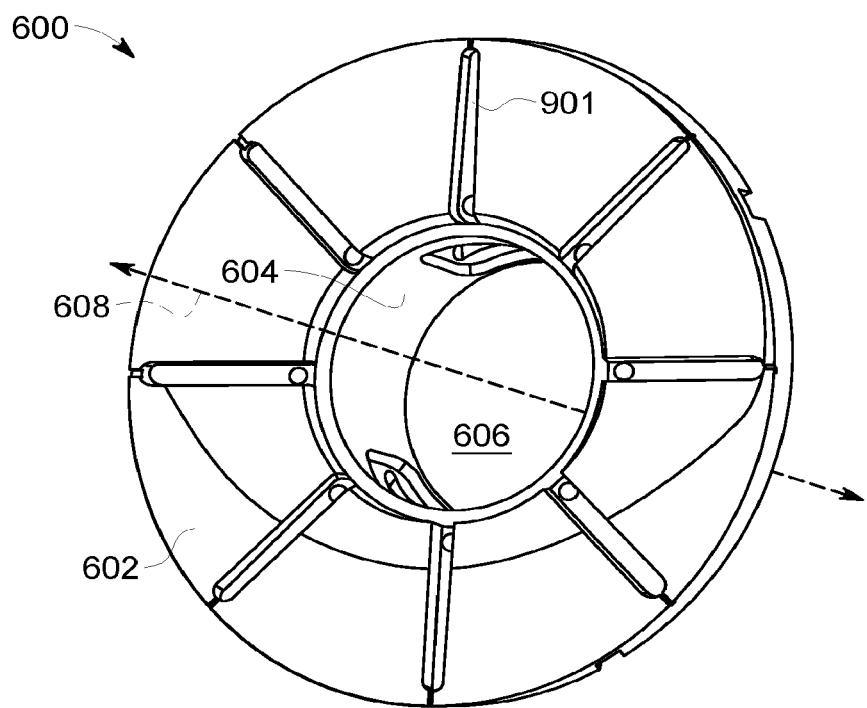
FIG. 7 illustrates another perspective view of the turbocharger bearing assembly shown in FIG. 6.
Figure 8:
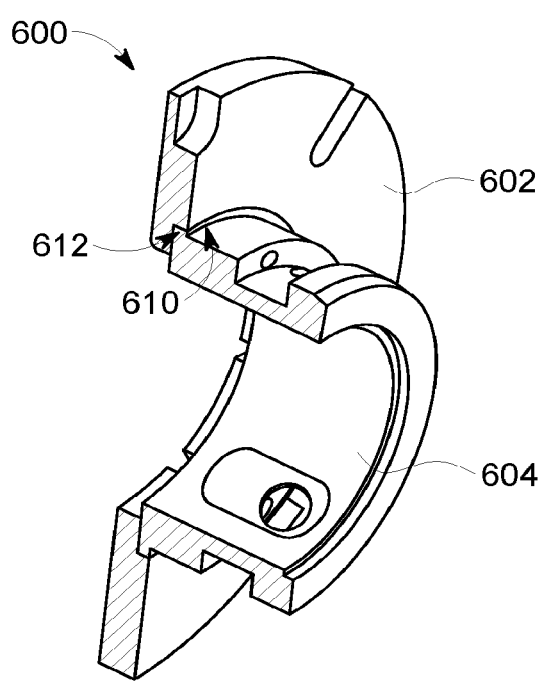
FIG. 8 illustrates a cross-sectional view of the turbocharger bearing assembly shown in FIGS. 6 and 7.

FIG. 6 illustrates a perspective view of a turbocharger bearing assembly 600 according to one embodiment of the inventive subject matter described herein. FIG. 7 illustrates another perspective view of the turbocharger bearing assembly 600 shown in FIG. 6. FIG. 8 illustrates a cross-sectional view of the turbocharger bearing assembly 600 shown in FIGS. 6 and 7. The bearing assembly 600 may be used in a turbocharger in place of the bearing assembly 100 shown in FIGS. 1 through 5 as a substitution of the integrated bearing system. This two-piece bearing design eliminates the need for the spacer ring, retaining tabs and other fasteners used to bolt the tabs to the casing. The bearing assembly 600 includes a thrust bearing 602 coupled with the journal bearing 604. The axial direction 608 represents the axis of rotation of the rotor that is disposed in the opening 606. The thrust bearing 200 is placed between a thrust collar which is part of the rotor assembly and the casing of the turbocharger. The thrust bearing 200 carries the axial load from the rotor to the casing through lubrication.

Figure 9:
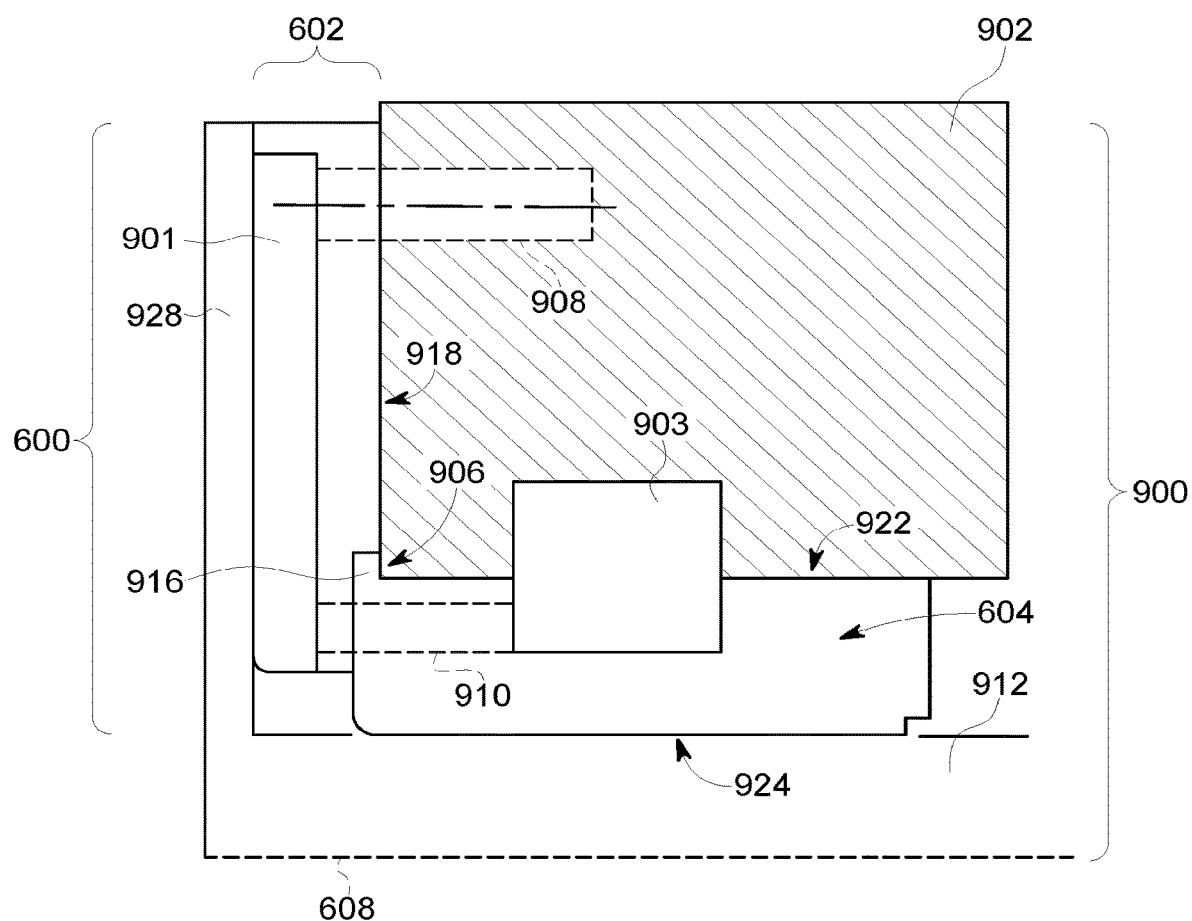
FIG. 9 is a cross-sectional view of a turbocharger having the bearing assembly shown in FIGS. 6 through 8 according to one embodiment, as assembled in the turbocharger casing.

FIG. 9 is a cross-sectional view of a turbocharger 900 having the bearing assembly 600 shown in FIGS. 6 through 8 according to one embodiment. The axis of a turbocharger rotor 912 of the turbocharger 900 is designated as 608 in this cross sectional view. Part of the turbocharger casing is shown as 902, which directly engages with the thrust bearing 602 along a face surface 918 of the thrust bearing 602. The casing 902 also engages with the outer diameter of the semi-floating journal bearing 604 via a lubricating oil film along an outer surface 922 of the journal bearing 604. The semi-floating journal bearing 604 engages the shaft of the turbocharger rotor 912 through a lubricating oil film along an inner surface 924 of the journal bearing 604. The thrust bearing 602 also engages a thrust face 928 of the rotor 912. A section 901 of the thrust bearing 602 represents a radially extending lubricating oil feed groove into the thrust bearing 602. Several of these groves are visible in FIG. 7.

Axial motion of the semi-floating dual film bearing 604 is restrained using a small shoulder step 906 in the journal bearing 604. This shoulder step 906 fits into a recess 916 extending upward or radially outward into the thrust bearing 602. The shoulder step 906 is constrained between the turbocharger casing 902 and the thrust bearing 602. However, there is enough axial and radial clearance between the thrust bearing 602 and the journal bearing 604 at the points of contact between the bearings 602, 604 in the shoulder step 906 to allow the journal bearing 604 to float, or radially move, relative to the thrust bearing 604 in one or more directions.

The shoulder step 906 may not be symmetrical along or about the entire 360 degrees or circumference of the outer surface 922 of the journal bearing 604. The shoulder step 906 can include the flat segment 610 (shown in FIG. 8) that engages the mating flat segment 612 (shown in FIGS. 6 and 8) of the thrust bearing 602, or any other mating discontinuity between the thrust and journal bearings 602, 604. The semi-floating journal bearing 604 is prevented from rotating relative to the thrust bearing 602 via the mating feature engagement between the flat segment 610 of the journal bearing 604 and the flat segment 612 of the thrust bearing 602.

The bearing assembly 600 shown in FIG. 9 optionally includes one or more dowel pins 908 extending through the thrust bearing 602 and the turbocharger casing 902. These dowel pins 908 adjust the positioning of the thrust bearing 602 relative to the casing 902 and prevent the thrust bearing 602 (and therefore the semi-floating journal bearing 604) from rotation relative to the casing 902. The bearing assembly 600 shown in FIG. 9 optionally includes an oil feed cavity 903 and/or one or more oil feed passages 910 extending through the journal bearing 604 and the thrust bearing 602. These passages 910 provide a conduit in which lubricating oil can move to the thrust bearing 602 from the oil supply provided to the journal bearing 604.

Figure 10:
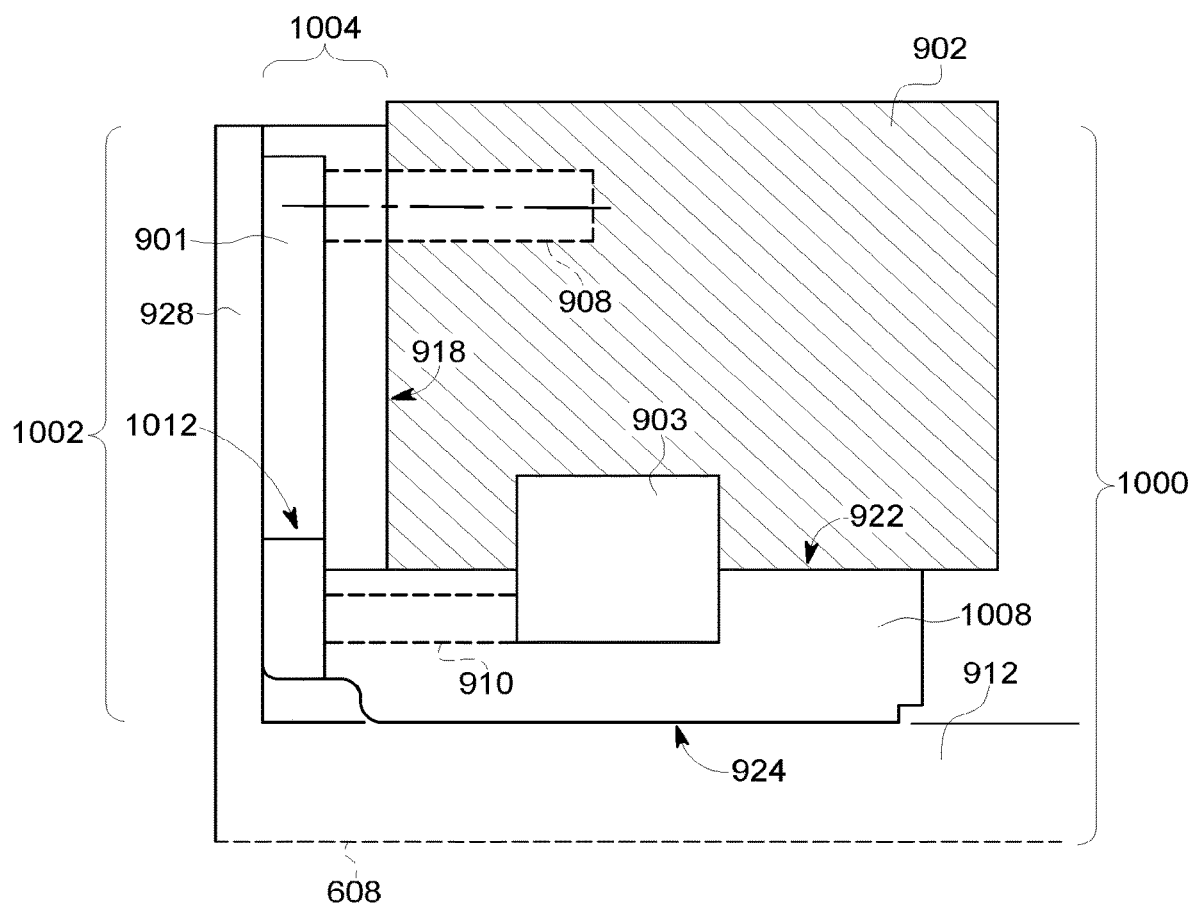
FIG. 10 is a cross-sectional view of a turbocharger having another embodiment of a bearing assembly, as assembled in the turbocharger casing.

FIG. 10 is a cross-sectional view of a turbocharger 1000 having another embodiment of a bearing assembly 1002. The bearing assembly 1002 includes a thrust bearing 1004, which may represent the thrust bearing 602 shown in FIGS. 6 through 8. The bearing assembly 1002 also includes a semi-floating journal bearing 1008, which may represent the journal bearing 604 shown in FIGS. 6 through 8. This is another embodiment of the inventive design which allows simple two-piece integrated bearing design. The main difference here from the design proposed in FIG. 9 is that a shoulder step 1012 in the semi-floating journal bearing 1008 is placed between the thrust bearing 1004 and a thrust collar, which is connected to the rotor assembly 912. In this design, the shoulder step 1012 is farther from the casing 902 along an axial direction of the rotor 912 than the shoulder step 906 shown in FIG. 9. As a result, at least part of the thrust bearing 1004 is between the shoulder step 1012 of the journal bearing 1008 and the casing 902. The shoulder step 1012 is restricted between the thrust bearing 1004 and the thrust collar, and this prevents axial movement of the journal bearing 1008. In FIG. 9, the shoulder step was placed between the casing and the thrust bearing, which has the advantage of allowing the thrust bearing to leverage a bigger axial area to carry axial load.

Figure 11:
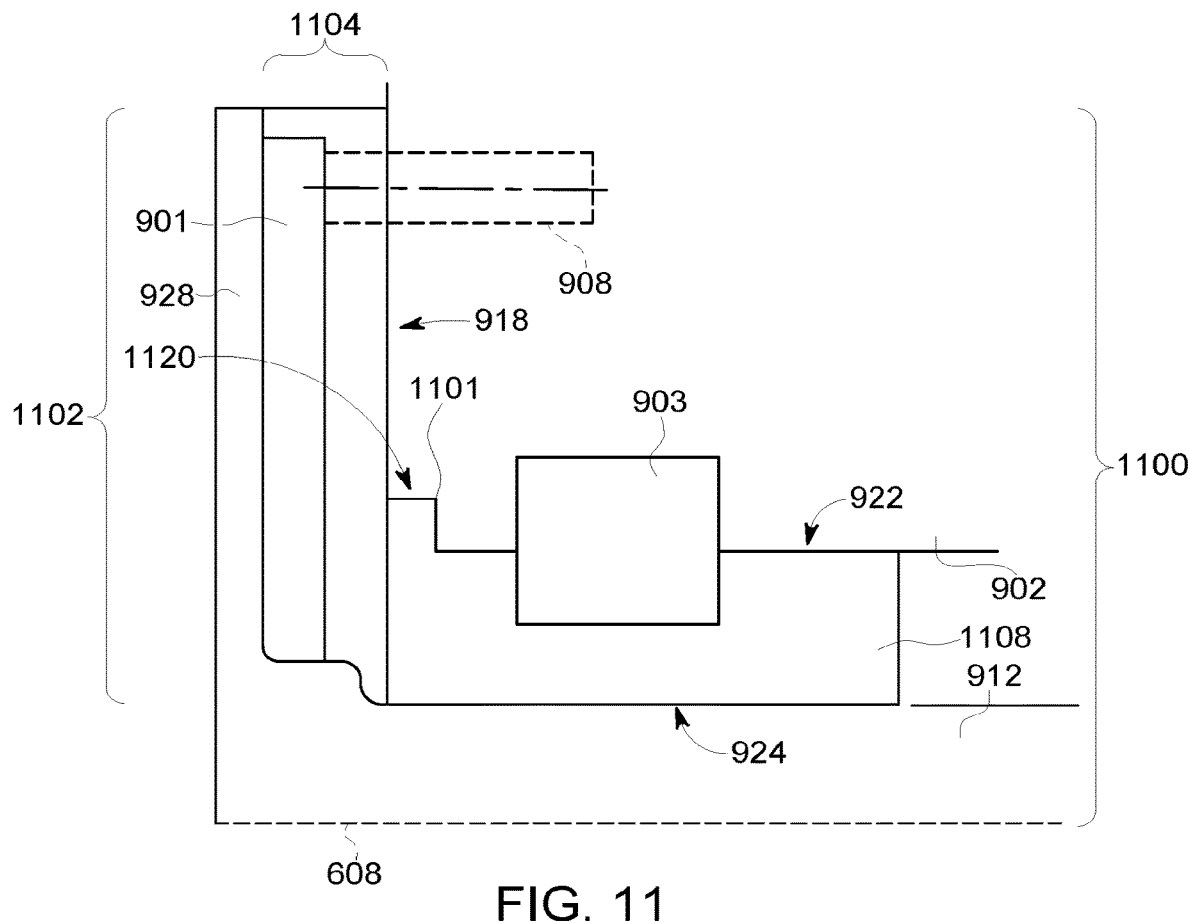
FIG. 11 is a cross-sectional view of a turbocharger having another embodiment of a bearing assembly, as assembled in the turbocharger casing.

FIG. 11 is a cross-sectional view of a turbocharger 1100 having another embodiment of a bearing assembly 1102 installed in the turbocharger casing 1106. The bearing assembly 1102 includes a thrust bearing 1104, which may represent the thrust bearing 602 shown in FIGS. 6 through 8. The bearing assembly 1102 also includes a semi-floating journal bearing 1108, which may represent the journal bearing 604 shown in FIGS. 6 through 8. One difference from the design shown in FIG. 9 is that a shoulder step 1101 in the semi-floating journal bearing 1108 is placed in a recess 1120 in the casing 1106, instead of a recess in the thrust bearing 1104 as shown in FIG. 9. In this design, the recess 1120 may be machined or otherwise cut into the casing 1106. Alternatively, the recess 1120 may be formed in the casing 1106 when the casing 1106 is created or formed. The shoulder step 1101 of the journal bearing 1108 is axially restricted between the casing 1106 and the thrust bearing 1104 with a clearance. This engagement limits or prevents axial movement of the journal bearing 1108. The axial length of a recess 1120 in the journal bearing 1108 does not carry radial load in this design.

Figure 12:
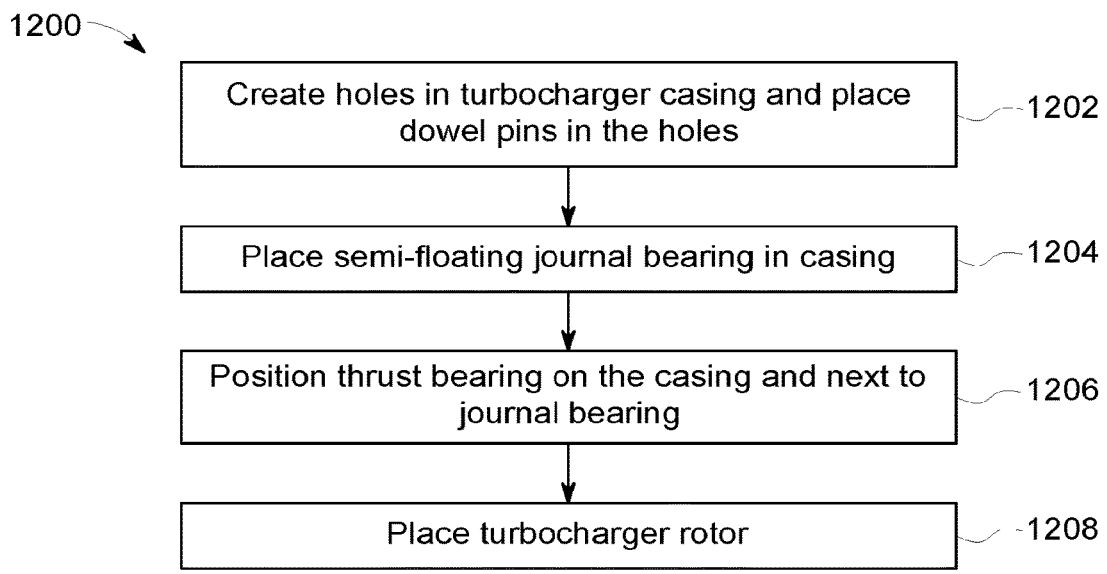
FIG. 12 illustrates a flowchart of a method for providing a bearing assembly for a turbocharger.

FIG. 12 illustrates a flowchart of a method 1200 for installation of an integrated semi-floating dual film bearing assembly for a turbocharger. The method 1200 may be used to install one or more of the bearing assemblies described herein and/or for retrofitting an existing turbocharger with one or more of the bearing assemblies described herein. At 1202, holes are machined in the turbocharger casing and dowel pins are placed in them. These dowel pins will be guides to position the thrust bearing in place and also prevent the rotation of the bearing assembly during operation. These holes may be manufactured in the casing for new turbochargers or simply be machined through a fixture guide in the case of a retrofit assembly.

At 1204, the semi-floating journal bearing is positioned in the casing so that the shoulder step in the journal bearing sits against the edge of the casing. The journal bearing will be fit into the space between the rotor and the casing so that the arm fits into the recess formed in the casing or thrust bearing, as described above. At 1206, the thrust bearing is positioned on the casing and next to the journal bearing. Positioning of the thrust bearing should be carried out with consideration of the dowel pins in the casing and mating features in the shoulder step of the journal bearing. At 1208, the turbocharger rotor is placed into or through the journal bearing and thrust bearing to complete the assembly of the integrated bearing assembly between the turbocharger casing and rotor.

In one embodiment, an integrated bearing assembly includes a thrust bearing disposed along a face of a turbocharger casing in a turbocharger and extending circumferentially around an axis of rotation of a rotor of the turbocharger, and a dual film journal bearing radially disposed between the rotor and the turbocharger casing. The journal bearing includes a shoulder step radially extending away from the rotor. The shoulder step of the journal bearing engages one or more of the thrust bearing or the turbocharger casing to prevent axial movement of the journal bearing relative to the turbocharger casing.

In one example, the thrust bearing includes a recess radially extending into the thrust bearing away from the rotor, and wherein the shoulder step of the journal bearing extends into the recess.

In one example, the recess in the thrust bearing and the shoulder step in the journal bearing both circumferentially extend around the axis of rotation of the rotor. The shoulder step in the journal bearing and the recess in the thrust bearing can include flat segments that mate with each other to prevent rotation of the journal bearing relative to the thrust bearing.

In one example, the shoulder step of the journal bearing radially extends away from the rotor and along a surface of the turbocharger casing that also engages the thrust bearing.

In one example, the shoulder step of the journal bearing is spaced apart from the turbocharger casing along axial directions that are parallel to the axis of rotation of the rotor with a portion of the thrust bearing disposed between the shoulder step of the journal bearing and the turbocharger casing along the axial directions.

In one example, the shoulder step of the journal bearing radially extends away from the rotor and into a recess in the turbocharger casing.

In one example, the shoulder step of the journal bearing radially extends away from the rotor and along a surface of the thrust bearing that also engages the turbocharger casing.

In one example, the bearing assembly also includes one or more dowel pins that engage with the thrust bearing and the turbocharger casing along axial directions that are parallel to the axis of rotation of the rotor.

In one example, the one or more dowel pins secure the thrust bearing in a position with respect to the turbocharger casing and restrict rotation of the bearing assembly.

In one embodiment, an integrated bearing assembly includes a thrust bearing disposed along a face of a turbocharger casing. The thrust bearing includes a recess along an inner diameter of the thrust bearing. The bearing assembly also includes a dual film journal bearing radially disposed between a rotor and the turbocharger casing. The journal bearing includes a shoulder step radially extending away from the rotor toward the thrust bearing. The shoulder step of the journal bearing prevents axial movement of the journal bearing by engaging one or more of the thrust bearing or the turbocharger casing.

In one example, the shoulder step of the journal bearing radially extends along a surface of the turbocharger casing that also engages the thrust bearing.

In one example, the thrust bearing includes a recess that radially extends into the thrust bearing in directions away from the rotor. The shoulder step of the journal bearing can extend into the recess.

In one example, the shoulder step of the journal bearing is spaced apart from the turbocharger casing such that a portion of the thrust bearing is disposed between the shoulder step of the journal bearing and the turbocharger casing.

In one example, the shoulder step of the journal bearing radially extends into the turbocharger casing in directions away from the rotor.

In one example, the shoulder step of the journal bearing radially extends along a surface of the thrust bearing that also engages the turbocharger casing.

In one example, the turbocharger casing includes a recess radially extending into the turbocharger casing. The shoulder step of the journal bearing extends into the recess.

In one embodiment, a method includes obtaining a semi-floating journal bearing of a turbocharger having an outwardly and radially extending shoulder step, positioning the journal bearing into a casing of the turbocharger, and positioning a thrust bearing onto a surface of the casing of the turbocharger such that the shoulder step of the journal bearing engages one or more of the thrust bearing or the casing of the turbocharger to prevent axial movement of the journal bearing relative to the casing of the turbocharger.

In one example, positioning the thrust bearing onto the surface of the casing of the turbocharger includes positioning the thrust bearing such that the shoulder step of the journal bearing extends into a recess of the thrust bearing and extends along the surface of the casing of the turbocharger.

In one example, positioning the thrust bearing onto the surface of the casing of the turbocharger includes positioning the thrust bearing such that the shoulder step of the journal bearing extends into a recess of the casing of the turbocharger.

In one example, positioning the thrust bearing onto the surface of the casing of the turbocharger includes positioning the thrust bearing such that the shoulder step of the journal bearing is radially spaced apart from the casing of the turbocharger.

In one example, the method also includes placing one or more dowel pins through holes in the thrust bearing and the casing of the turbocharger to prevent rotation of the thrust bearing relative to the casing of the turbocharger.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An integrated bearing assembly comprising:
   a thrust bearing disposed along a first surface of a turbocharger casing in a turbocharger and extending circumferentially around an axis of rotation of a rotor of the turbocharger; and
   a dual film journal bearing radially disposed between the rotor and the turbocharger casing, wherein an outer surface of the dual film journal bearing is disposed along a second surface of the turbocharger casing and along a surface of a first portion of the thrust bearing, wherein the dual film journal bearing includes a shoulder step radially extending away from the rotor and the outer surface of the dual film journal bearing, the shoulder step of the dual film journal bearing configured to restrict axial movement of the dual film journal bearing relative to the turbocharger casing,
   wherein the shoulder step of the dual film journal bearing is spaced apart from the turbocharger casing along an axial direction that is parallel to the axis of rotation of the rotor with the first portion of the thrust bearing disposed between the shoulder step of the dual film journal bearing and the turbocharger casing along the axial direction
   wherein the thrust bearing includes a recess radially extending into the thrust bearing away from the rotor, and wherein the shoulder step of the dual film journal bearing extends into the recess.

2. The integrated bearing assembly of claim 1, wherein the recess of the thrust bearing and the shoulder step of the dual film journal bearing both circumferentially extend around the axis of rotation of the rotor, wherein the shoulder step of the dual film journal bearing and the recess of the thrust bearing include flat segments that mate with each other to prevent rotation of the dual film journal bearing relative to the thrust bearing.

3. The integrated bearing assembly of claim 1, further comprising one or more dowel pins that engage with the thrust bearing and the turbocharger casing along the axial direction that is parallel to the axis of rotation of the rotor.

4. The integrated bearing assembly of claim 1, further comprising one or more dowel pins securing the thrust bearing in a position with respect to the turbocharger casing and restricting rotation of the bearing assembly.

5. The integrated bearing assembly of claim 1, wherein a portion of the dual film journal bearing is radially separated from the turbocharger casing by an oil feed cavity.

6. The integrated bearing assembly of claim 1, wherein the thrust bearing includes a radially extending oil feed groove, and the shoulder step of the dual film journal bearing is axially aligned with the oil feed groove of the thrust bearing.

7. The integrated bearing assembly of claim 1, wherein the first portion of the thrust bearing is axially disposed between the shoulder step of the dual film journal bearing and the turbocharger casing, and a second portion of the thrust bearing is axially disposed between a thrust face of the rotor and the turbocharger casing.

8. The integrated bearing assembly of claim 1, wherein the shoulder step of the dual film journal bearing is disposed between the first portion of the thrust bearing and a thrust face of the rotor.

9. The integrated bearing assembly of claim 1, wherein the surface of the first portion of the thrust bearing is radially aligned with the second surface of a turbocharging casing.

10. An integrated bearing assembly comprising:
a thrust bearing disposed along a first surface of a turbocharger casing, the thrust bearing including a recess along an inner diameter of the thrust bearing; and
a dual film journal bearing radially disposed between a rotor and the turbocharger casing, wherein an outer surface of the dual film journal bearing is disposed along a second surface of the turbocharger casing and along a surface of a first portion of the thrust bearing, wherein the dual film journal bearing includes a shoulder step radially extending away from the rotor toward the thrust bearing, wherein the shoulder step of the dual film journal bearing is configured to restrict axial movement of the dual film journal bearing relative to the turbocharger casing,
wherein the shoulder step of the dual film journal bearing is spaced apart from the turbocharger casing along an axial direction that is parallel to an axis of rotation of the rotor,
wherein a portion of the dual film journal bearing is radially separated from the turbocharger casing by an oil feed cavity.

11. The integrated bearing assembly of claim 10, wherein the recess extends radially into the thrust bearing away from the rotor, and wherein the shoulder step of the dual film journal bearing extends into the recess.

12. The integrated bearing assembly of claim 10, wherein the thrust bearing includes a radially extending oil feed groove, and the shoulder step of the dual film journal bearing is axially aligned with the oil feed groove of the thrust bearing.

13. The integrated bearing assembly of claim 10, wherein the first portion of the thrust bearing is axially disposed between the shoulder step of the dual film journal bearing and the turbocharger casing, and a second portion of the thrust bearing is axially disposed between a thrust face of the rotor and the turbocharger casing.

14. The integrated bearing assembly of claim 10, wherein the shoulder step of the dual film journal bearing is disposed between the first portion of the thrust bearing and a thrust face of the rotor.

15. The integrated bearing assembly of claim 10, wherein the surface of the first portion of the thrust bearing is radially aligned with the second surface of a turbocharging casing.

16. A method comprising:
obtaining a journal bearing of a turbocharger having an outwardly and radially extending shoulder step;
positioning the journal bearing into a casing of the turbocharger;
positioning a thrust bearing onto a first surface of the casing of the turbocharger such that the shoulder step of the journal bearing engages the thrust bearing to restrict axial movement of the journal bearing relative to the thrust bearing and the casing of the turbocharger, wherein an outer surface of the journal bearing is disposed along a second surface of the casing of the turbocharger and along a surface of a first portion of the thrust bearing, wherein the first portion of the thrust bearing is axially disposed between the shoulder step of the journal bearing and the casing of the turbocharger, and a second portion of the thrust bearing is axially disposed between a thrust face of a rotor and the casing of the turbocharger;
placing one or more dowel pins through holes in the thrust bearing and the casing of the turbocharger to prevent rotation of the thrust bearing relative to the casing of the turbocharger; and
the positioning the thrust bearing onto the first surface of the casing of the turbocharger includes positioning the thrust bearing such that the shoulder step of the journal bearing extends into a recess of the thrust bearing.

17. The method of claim 16, wherein the positioning the thrust bearing onto the first surface of the casing of the turbocharger includes positioning the thrust bearing such that the shoulder step of the journal bearing is separated from the turbocharger casing by an oil feed cavity.

18. The method of claim 16, wherein the positioning the thrust bearing onto the first surface of the casing of the turbocharger includes positioning the thrust bearing such that the shoulder step of the journal bearing is axially spaced apart from the casing of the turbocharger.

\* \* \* \* \*